(12) United States Patent
Won et al.

(10) Patent No.: US 10,472,566 B2
(45) Date of Patent: Nov. 12, 2019

(54) PHOSPHOR PLATE COMPOSITION AND PHOSPHOR PLATE FOR VEHICLE HEADLAMP COMPRISING SAME

(71) Applicant: LG INNOTEK CO., LTD., Seoul (KR)

(72) Inventors: Ju Yeon Won, Seoul (KR); Won Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/745,970

(22) PCT Filed: Jul. 28, 2016

(86) PCT No.: PCT/KR2016/008277
§ 371 (c)(1),
(2) Date: Jan. 18, 2018

(87) PCT Pub. No.: WO2017/018824
PCT Pub. Date: Feb. 2, 2017

(65) Prior Publication Data
US 2018/0216001 A1  Aug. 2, 2018

(30) Foreign Application Priority Data

Jul. 29, 2015  (KR) .................. 10-2015-0107022

(51) Int. Cl.
*F21Y 115/30* (2016.01)
*F21S 41/176* (2018.01)
(Continued)

(52) U.S. Cl.
CPC ............ *C09K 11/7706* (2013.01); *B60Q 1/04* (2013.01); *C09K 11/7774* (2013.01); *F21S 41/16* (2018.01); *F21S 41/176* (2018.01); *F21Y 2115/30* (2016.08)

(58) Field of Classification Search
USPC .................................................. 428/690, 917
See application file for complete search history.

(56) References Cited

U.S. PATENT DOCUMENTS

2005/0015175 A1*  1/2005  Huang ................... B29C 41/02
                                                              700/121
2010/0207512 A1   8/2010  Miyagawa et al.
(Continued)

FOREIGN PATENT DOCUMENTS

JP    2003-119070    4/2003
JP    2011-513898    4/2011
(Continued)

OTHER PUBLICATIONS

International Search Report (with English Translation) and Written Opinion dated Oct. 20, 2016 issued in Application No. PCT/KR2016/008277.

*Primary Examiner* — Ashok Patel
(74) *Attorney, Agent, or Firm* — Ked & Associates, LLP

(57) ABSTRACT

Examples of the present invention relate to a phosphor plate composition having a wide emission region while improving luminance. The composition comprises: yttrium aluminum garnet (YAG) or gadolinium yttrium aluminum garnet ((Gd,Y)AG) phosphor powders doped with any one dopant selected from cerium (Ce), gadolinium (Gd) and neodymium (Nd); and a sintering agent of any one selected from lithium fluoride (LiF), magnesium oxide (MgO) and spinel ($MgAl_2O_4$).

7 Claims, 5 Drawing Sheets

LD

(51) Int. Cl.
  *C09K 11/77* (2006.01)
  *B60Q 1/04* (2006.01)
  *F21S 41/16* (2018.01)

(56) References Cited

U.S. PATENT DOCUMENTS

| | | | | |
|---|---|---|---|---|
| 2011/0227476 A1* | 9/2011 | Zhang | ................ | B32B 18/00 |
| | | | | 313/503 |
| 2011/0227477 A1* | 9/2011 | Zhang | ................ | B32B 18/00 |
| | | | | 313/503 |
| 2013/0116756 A1* | 5/2013 | Juestel | ............ | C09K 11/7774 |
| | | | | 607/88 |
| 2013/0313967 A1* | 11/2013 | Zhang | ................ | B32B 18/00 |
| | | | | 313/503 |

FOREIGN PATENT DOCUMENTS

| | | |
|---|---|---|
| JP | 2013-526007 | 6/2013 |
| KR | 10-2013-0008525 | 1/2013 |
| WO | WO 2009/105581 | 8/2009 |
| WO | WO 2011/097137 | 8/2011 |
| WO | WO 2011/115820 | 9/2011 |

* cited by examiner

PHOSPHOR PLATE COMPOSITION AND PHOSPHOR PLATE FOR VEHICLE HEADLAMP COMPRISING SAME

CROSS-REFERENCE TO RELATED PATENT APPLICATIONS

This application is a U.S. National Stage Application under 35 U.S.C. § 371 of PCT Application No. PCT/KR2016/008277, filed Jul. 28, 2016, which claims priority to Korean Patent Application No. 10-2015-0107022, filed Jul. 29, 2015, whose entire disclosures are hereby incorporated by reference.

TECHNICAL FIELD

The embodiments of the present invention relate to a phosphor plate composition and a phosphor plate for a vehicle headlamp including the phosphor plate composition.

BACKGROUND

Laser diodes (LDs) have the advantage of excellent linearity of light. However, when a laser diode is used in a vehicle headlamp or the like where a wide distribution of emitted light is desired, such linearity of light is a disadvantage. An additive capable of controlling light scattering or the like has been applied to induce the spreading of light, but such an additive may cause a problem such as a decrease in light transmittance, backscattering that reduces luminance, or the like.

DISCLOSURE

Technical Problem

The embodiments of the present invention have been made to solve the above-mentioned problems and are particularly directed to provide a composition for a phosphor plate simultaneously having improved luminance and a wide distribution of emitted light and to provide a phosphor plate for a vehicle headlamp made of the composition.

Technical Solution

To solve the above-mentioned problems, the embodiments of the present invention are directed to provide a phosphor plate composition containing a garnet-based phosphor powder containing yttrium aluminum garnet (YAG), gadolinium yttrium aluminum garnet ((Gd,Y)AG), or lutetium aluminum garnet (LuAG) and doped with any one dopant selected from cerium (Ce), gadolinium (Gd), gallium (Ga), and neodymium (Nd); and any one sintering agent among lithium fluoride (LiF), magnesium oxide (MgO), and spinel (MgAl2O4).

In addition, the phosphor plate composition may be used to form a phosphor plate for a vehicle headlamp.

Advantageous Effects

According to one embodiment of the present invention, a phosphor plate made of the phosphor plate composition of the present invention can simultaneously have a wide distribution of emitted light and improved luminance.

In addition, the grains formed in the phosphor plate may have a size of 3 μm or less.

MODES OF THE INVENTION

Figure 1:
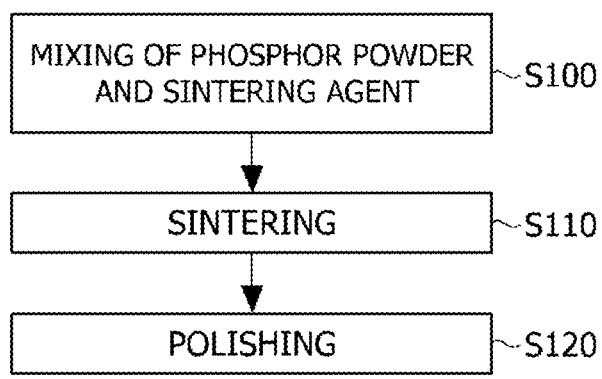
FIG. 1 is a flowchart for illustrating a method of manufacturing a phosphor plate according to one embodiment of the present invention.

Hereinafter, preferred embodiments of the present invention will be described in detail with reference to the accompanying drawings in order that the present invention can be easily implemented by those skilled in the art. It should be understood, however, that the embodiments described in the present specification and the configurations shown in the drawings are only preferred embodiments of the present invention, and that various equivalents and modifications may be made thereto at the time of filing of the application of the present invention. In addition, in providing a detailed description of the operation principle of preferred embodiments of the present invention, a detailed description of a known function or configuration incorporated herein will be omitted when it may unnecessarily obscure the gist of the present invention. The following terms are defined in consideration of functions in the present invention, and the meanings of the terms should be interpreted based on the contents throughout the present specification.

In one embodiment, the phosphor plate composition of the present invention contains a garnet-based phosphor powder containing yttrium aluminum garnet (YAG), gadolinium yttrium aluminum garnet ((Gd,Y)AG), or lutetium aluminum garnet (LuAG) and doped with any one dopant selected from cerium (Ce), gadolinium (Gd), gallium (Ga), and neodymium (Nd); and a sintering agent.

The phosphor powder contained in the phosphor plate composition may have an average particle size of 50 to 300 nm, preferably 100 to 200 nm. When the phosphor powder has a particle size of greater than 300 nm, the phosphor plate produced by sintering may exhibit poor optical characteristics due to having a grain size of greater than 3 μm. On the other hand, when the phosphor powder has a particle size of 50 to 300 nm, the phosphor plate produced by sintering may have a low internal porosity and an appropriate grain size, and these are advantageous for the phosphor plate in exhibiting improved optical characteristics. However, when the phosphor powder has a particle size of less than 50 nm, particles thereof may not be sufficiently dispersed due to agglomeration, and this may result in excessive formation of pores and non-uniform grain growth.

In one embodiment, the dopant for doping the phosphor powder of the present invention may be at least one selected from Ce, Gd, Ga, and Nd. The content of the dopant is preferably 0.05 to 3.5 wt % based on the entire composition.

In one embodiment, the sintering agent contained in the phosphor plate composition of the present invention may be any one sintering agent among lithium fluoride (LiF), magnesium oxide (MgO), and spinel (MgAl2O4). The sintering agent may be contained in an amount of 0.01 to 1 wt %, preferably 0.02 to 0.5 wt %, more preferably 0.05 to 0.5 wt %, and even more preferably 0.05 to 0.1 wt %. When the content of the sintering agent is within this range, the phosphor plate produced by sintering the phosphor plate composition may have a grain size of 0.1 to 3 When the grain size of the obtained phosphor plate is within this range, the phosphor plate may be able to emit light over a large area and exhibit high average luminance at the same time.

FIG. 1 is a flowchart for illustrating a method of manufacturing a phosphor plate according to one embodiment of the present invention.

As shown in FIG. 1, a phosphor powder is mixed with a sintering agent (S100). Here, the phosphor powder may be a garnet-based phosphor powder and doped with a dopant, wherein the garnet-based phosphor powder may contain, for example, YAG, (Gd,Y)AG, or LuAG. The sintering agent may be at least one selected from LiF, MgO, MgAl2O4. In this case, the phosphor powder may have a particle size of 50 to 300 nm, and the content of the sintering agent may be 0.01 to 1 wt %.

In this case, a binder, a dispersing agent, or the like may be further added, and the powder mixture may be dispersed using a ball mill or the like.

Next, sintering (S110) is performed. First, the powder mixture prepared in S100 may be put into a mold, uniaxially pressed with a weight of about three tons for one minute, and then subjected to cold isostatic pressing (CIP) under a condition of about 2000 bars for five minutes. Then, vacuum sintering may be performed at a temperature of 1200° C. to 1800° C. and a pressure of 10-5 Torr or less for 1 to 20 hours.

Next, polishing (S120) is performed to produce a phosphor plate. A surface of the phosphor plate may be polished through the polishing process.

Figure 2:
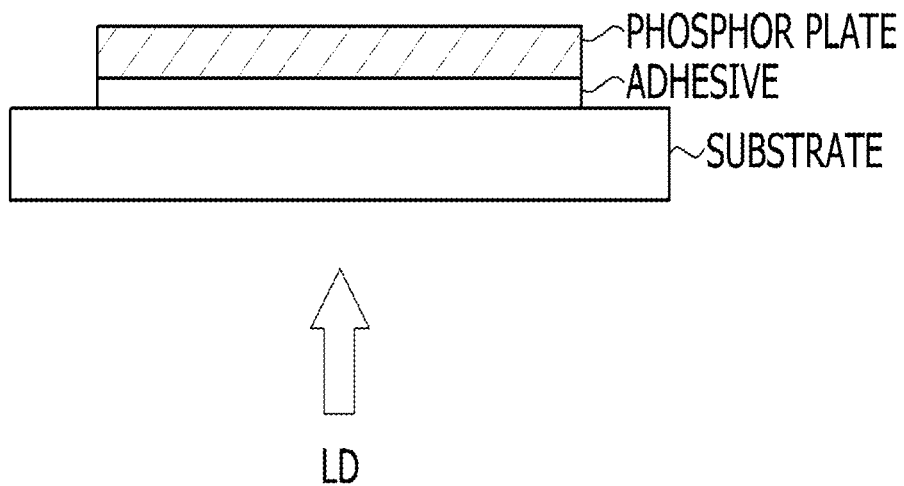
FIG. 2 is a structure for measuring the grain size and luminance of phosphor plates according to one embodiment of the present invention and comparative examples.

The following Table 1 shows the result of measuring the grain size and luminance of phosphor plates of the Example and Comparative Examples. As shown in FIG. 2, a phosphor plate having a thickness of 80 to 200 μm was adhered to a substrate, and an average luminance of a light luminance and a surface luminance when a laser diode (LD) was used as a light source was measured.

The Example is a phosphor plate including YAG doped with a dopant as a phosphor powder and MgAl2O4 as a sintering agent and obtained using a phosphor plate composition containing 0.05 wt % of the sintering agent, and the Comparative Examples are phosphor plates obtained under the same conditions as the Example but using phosphor plate compositions not containing a sintering agent. The results of Comparative Examples 1 to 3 were obtained while varying the usage conditions of the sintering agent.

TABLE 1

| Classification | | Luminance (Mnit, @800 mA) | |
|---|---|---|---|
| Sample | Grain size | Measured diameter | Average luminance |
| Example | ~3 μm | 0.5 | 33 |

TABLE 1-continued

| Classification | | Luminance (Mnit, @800 mA) | |
|---|---|---|---|
| Sample | Grain size | Measured diameter | Average luminance |
| Comparative Example 1 | ~15 μm | 0.5 | 22 |
| Comparative Example 2 | ~10 μm | 0.5 | 23 |
| Comparative Example 3 | ~7 μm | 0.5 | 25 |

Figure 3:
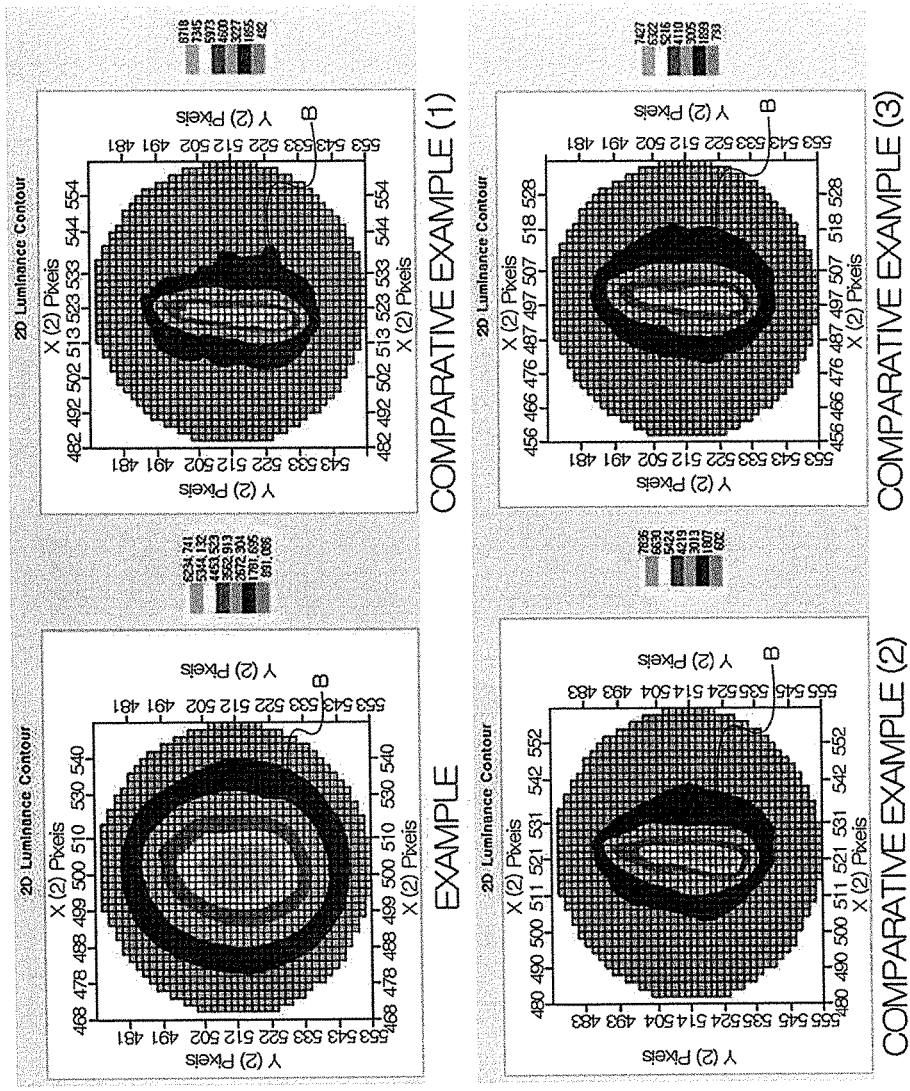
FIG. 3 is the result of testing the distribution of emitted light of a phosphor plate made of a phosphor plate composition according to one embodiment of the present invention.

As shown in Table 1, the Example, which contains a sintering agent, has a smaller grain size and exhibits higher average luminance compared to Comparative Examples 1 to 3, which do not contain a sintering agent. FIG. 3 is a set of images for showing the distribution of light emitted from the samples tested as shown in Table 1, and the sample containing a sintering agent has a uniform and broad B (blue) region, which denotes a wide distribution of emitted light. Based on this result, it is found that when a phosphor plate has a grain size of 3 μm or less, it can emit light over a large area without sacrificing luminance.

Figure 4:
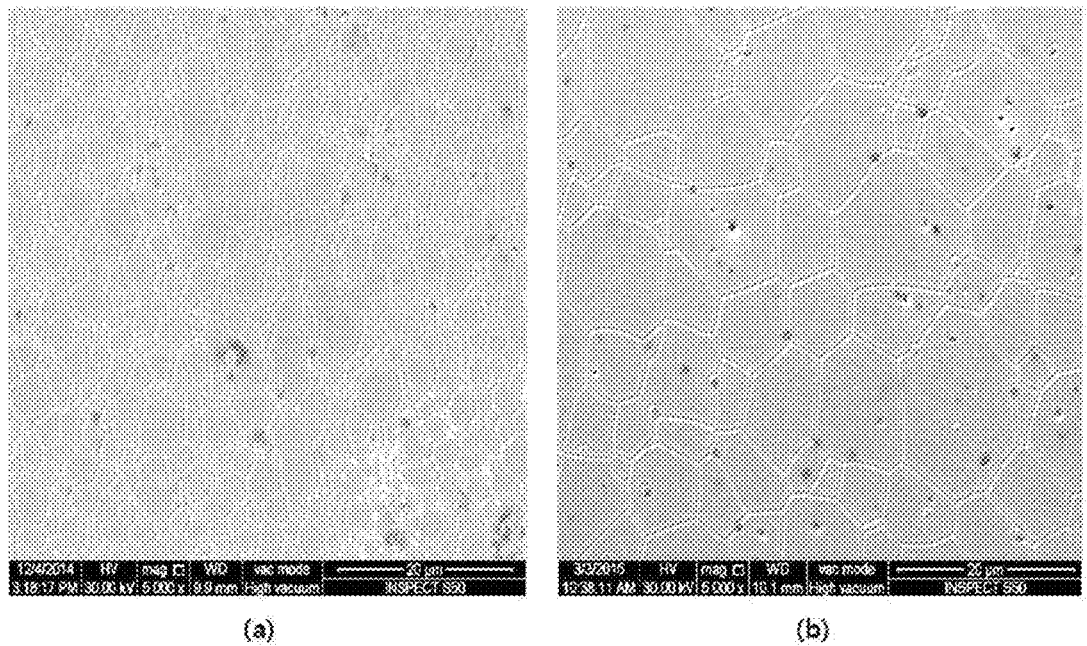
FIG. 4 is a set of scanning electron microscope (SEM) images for analyzing the grain size of a phosphor plate made of a phosphor plate composition.

As in the case of Example tested above, a phosphor plate made of the phosphor plate composition of the present invention may have a grain size of 3 μm or less, particularly 0.1 to 3 μm. FIG. 4 is a set of scanning electron microscope (SEM) images of the Example and Comparative Example 1 described in Table 1, wherein FIG. 4(a) shows the presence of polygonal grains with a size of 3 μm or less, and FIG. 4(b) shows the presence of polygonal grains with a size of 10 μm or more.

In addition, a phosphor plate containing a sintering agent in addition to a garnet-based phosphor powder including YAG, (Gd,Y)AG, or LuAG and doped with a dopant, such as in the case of the Example, emits light over a large area and exhibits improved luminance simultaneously.

Specifically, the experimental results show that LiF, MgO, and MgAl2O4 exhibit a critical effect as a sintering agent when contained in an amount of 0.05 to 0.5 wt %, 0.05 to 0.5 wt %, and 0.02 to 0.1 wt %, respectively, resulting in grains with a size of 3 μm or less and improved luminance.

Figure 5:
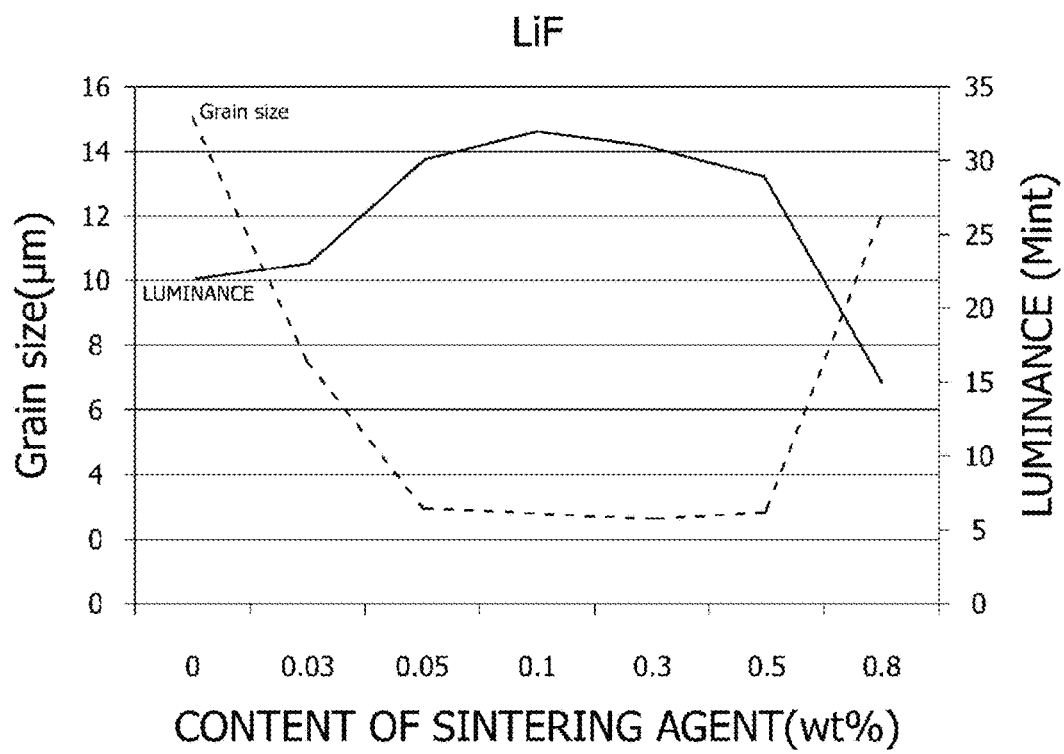
FIG. 5 shows the result of testing luminance and grain size while varying the content of, among the sintering agents, lithium fluoride (LiF).
Figure 6:
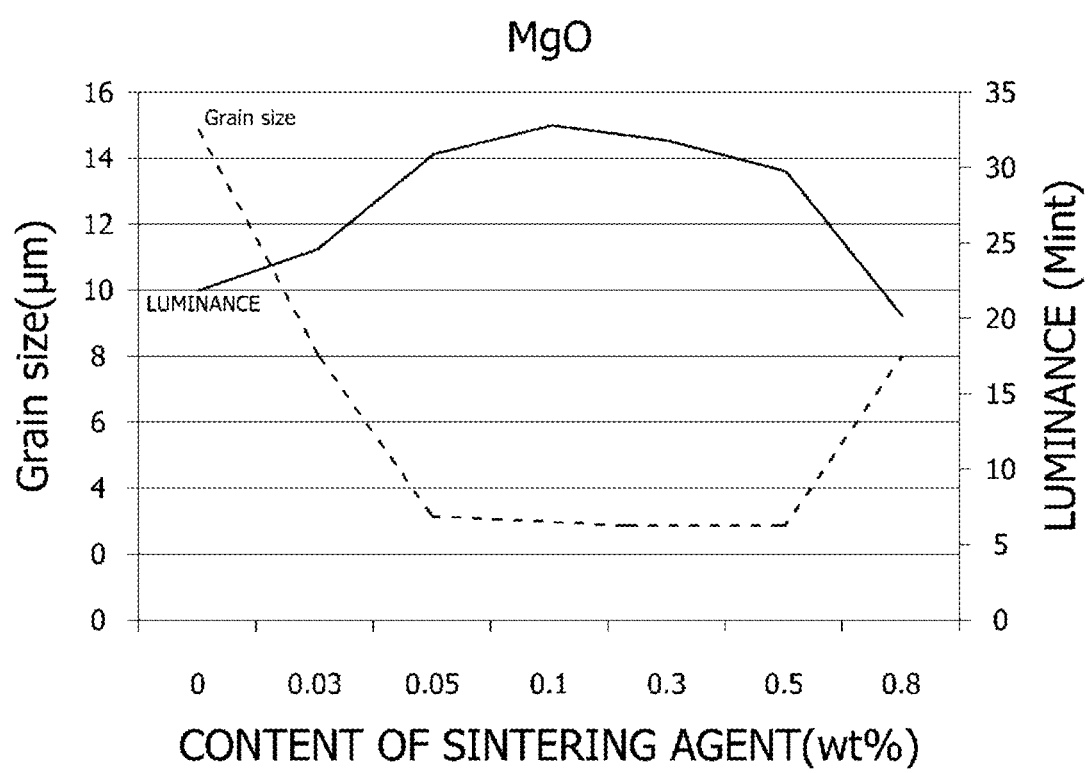
FIG. 6 shows the result of testing luminance and grain size while varying the content of, among the sintering agents, magnesium oxide (MgO).
Figure 7:
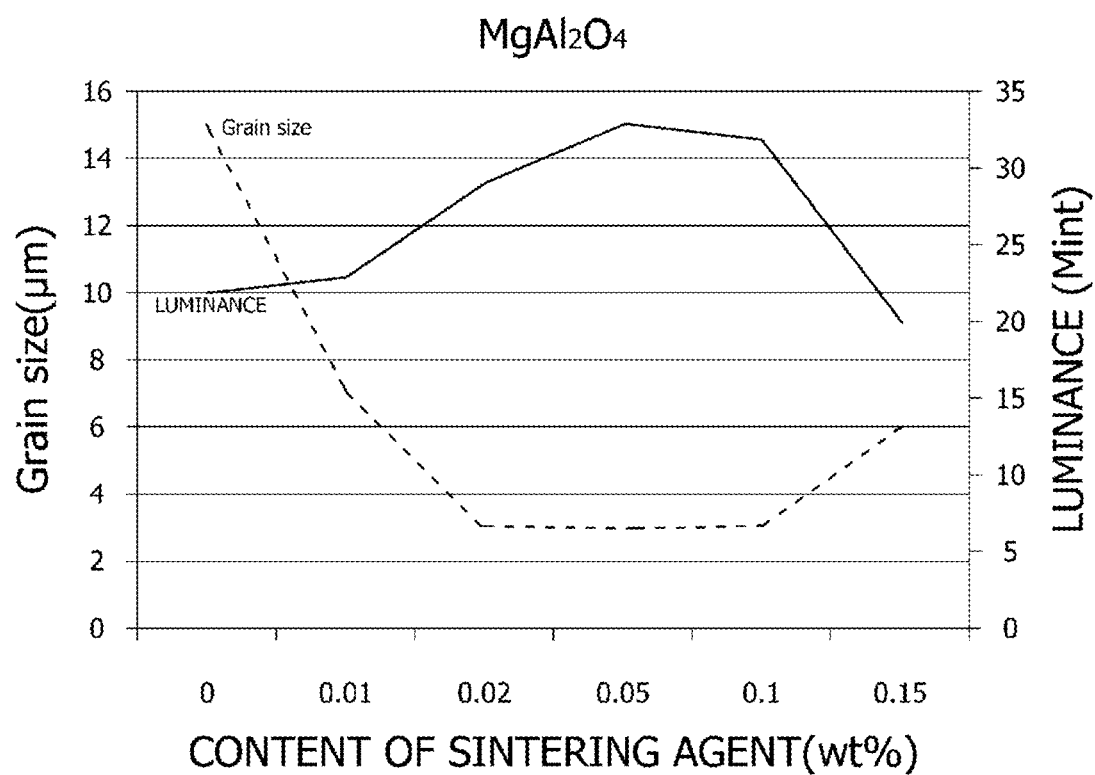
FIG. 7 shows the result of testing luminance and grain size while varying the content of, among the sintering agents, spinel (MgAl2O4).

FIGS. 5 to 7 are graphs for showing the results of testing grain size and luminance while varying the content of a sintering agent.

FIG. 5 shows the result of using LiF as a sintering agent according to one embodiment of the present invention. It can be seen that LiF exhibits a critical effect when contained in an amount of 0.05 to 0.5 wt %, resulting in a grain size of 3 μm or less and improved luminance.

FIG. 6 shows the result of using MgO as a sintering agent according to one embodiment of the present invention. It can be seen that MgO exhibits a critical effect when contained in an amount of 0.05 to 0.5 wt %, resulting in a grain size of 3 μm or less and improved luminance.

FIG. 7 shows the result of using MgAl2O4 as a sintering agent according to one embodiment of the present invention. It can be seen that MgAl2O4 exhibits a critical effect when contained in an amount of 0.02 to 0.1 wt %, resulting in a grain size of 3 μm or less and improved luminance.

A phosphor plate made of the composition of any of the above-described embodiments may be used in a lighting apparatus such as a vehicle headlamp. As described above, a laser diode used in a vehicle headlamp has excellent linearity of light, which is a disadvantage because a large spread (i.e., a wide distribution) of emitted light is desired in vehicle headlamps.

A phosphor plate according to one embodiment of the present invention can result in a laser diode capable of being advantageously used in a vehicle headlamp due to simultaneously having a wide distribution of emitted light and improved luminance.

When a phosphor plate according to one embodiment of the present invention is applied to a lighting apparatus such as a vehicle headlamp, the lighting apparatus may have a structure including a light source and a phosphor plate provided on the light source. In this case, an adhesive layer may be further provided between the light source and the phosphor plate.

While specific embodiments of the present invention have been provided in a detailed description of the present invention, various modifications are possible within the scope of the present invention. The technical spirit of the present invention should not be limited to the above-described embodiments of the present invention but determined by the claims and the equivalents of the claims.

The invention claimed is:

1. A lighting apparatus comprising:
a light source; and
a phosphor plate provided on the light source,
wherein the phosphor plate includes:
a phosphor powder based on garnet and doped with a dopant; and
a sintering agent consisting of spinel ($MgAl_2O_4$),
wherein an amount of $MgAl_2O_4$ is about 0.02 to 0.1 wt % of the phosphor plate, and
wherein the dopant is gadolinium (Gd).

2. The lighting apparatus of claim 1, wherein the phosphor powder based on garnet includes at least one among YAG and (Gd,Y)AG.

3. The lighting apparatus of claim 1, wherein the phosphor powder based on garnet includes LuAG.

4. The lighting apparatus of claim 1, wherein the phosphor plate has grains with a size of 0.1 to 3 μm.

5. The lighting apparatus of claim 1, wherein the phosphor plate has a thickness of 80 to 200 μm.

6. The lighting apparatus of claim 1, further comprising an adhesive layer provided between the light source and the phosphor plate.

7. A lighting apparatus comprising:
a light source; and
a phosphor plate provided on the light source,
wherein the phosphor plate includes:
a phosphor powder based on garnet and doped with a dopant; and
a sintering agent consisting of spinel ($MgAl_2O_4$),
wherein an amount of $MgAl_2O_4$ is about 0.02 to 0.1 wt % of the phosphor plate, and
wherein the dopant is gadolinium (Gd).

* * * * *